US011743712B2

(12) United States Patent
Grafulla-González et al.

(10) Patent No.: US 11,743,712 B2
(45) Date of Patent: Aug. 29, 2023

(54) AUTHORIZATION OF A DEVICE BEING EQUIPPED WITH AN EMBEDDED UNIVERSAL INTEGRATED CIRCUIT CARD

(71) Applicant: Telefonaktiebolaget LM Ericsson (publ), Stockholm (SE)

(72) Inventors: Beatriz Grafulla-González, Solna (SE); Jinhua Feng, Täby (SE); Morgan Lindqvist, Sundbyberg (SE); Rémi Robert, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 78 days.

(21) Appl. No.: 17/281,961

(22) PCT Filed: Oct. 5, 2018

(86) PCT No.: PCT/SE2018/051025
§ 371 (c)(1),
(2) Date: Mar. 31, 2021

(87) PCT Pub. No.: WO2020/071974
PCT Pub. Date: Apr. 9, 2020

(65) Prior Publication Data
US 2021/0360386 A1 Nov. 18, 2021

(51) Int. Cl.
*H04W 8/26* (2009.01)
*H04W 8/20* (2009.01)
*G05D 1/02* (2020.01)

(52) U.S. Cl.
CPC ........... *H04W 8/205* (2013.01); *H04W 8/265* (2013.01); *G05D 1/021* (2013.01)

(58) Field of Classification Search
CPC ............................ H04W 82/205; H04W 8/26
See application file for complete search history.

(56) References Cited

U.S. PATENT DOCUMENTS

2015/0289135 A1 10/2015 Berard et al.
2016/0020803 A1 1/2016 Cha et al.
(Continued)

FOREIGN PATENT DOCUMENTS

EP 2905980 A1 8/2015
EP 2986044 A1 2/2016
(Continued)

OTHER PUBLICATIONS

3GPP, "3rd Generation Partnership Project; Technical Specification Group Services and System Aspects; Generic Authentication Architecture (GAA); Generic Bootstrapping Architecture (GBA) (Release 15)", 3GPP TS 33.220 V15.1.0, Technical Specification, Jan. 2018, 93 pages.

(Continued)

Primary Examiner — Michael T Vu
(74) Attorney, Agent, or Firm — Nicholson De Vos Webster & Elliott LLP

(57) ABSTRACT

A method and device for registering an embedded Universal Integrated Circuit Card (eUICC) for a device and a method and device for controlling authorization of operation of a device being equipped with an eUICC. In an aspect, a method of a service node of registering an eUICC for a device is provided. The method comprises receiving information specifying ownership of the device and an identifier of the device, receiving an identifier of the eUICC and an identifier of the device, and storing the received information, wherein ownership of the device and the identifier of the eUICC being arranged in the device is registered with the service node.

10 Claims, 5 Drawing Sheets

(56) References Cited

U.S. PATENT DOCUMENTS

| | | | | |
|---|---|---|---|---|
| 2016/0134318 | A1* | 5/2016 | Wane | H04M 15/56 455/558 |
| 2016/0165433 | A1 | 6/2016 | Larignon et al. | |
| 2016/0330608 | A1* | 11/2016 | Benn | H04W 8/183 |
| 2018/0103335 | A1 | 4/2018 | Bruner et al. | |
| 2018/0137261 | A1* | 5/2018 | Lattin | H04L 63/0823 |

FOREIGN PATENT DOCUMENTS

| | | |
|---|---|---|
| EP | 3065431 A1 | 9/2016 |
| WO | 2013/036011 A2 | 3/2013 |
| WO | 2014/000157 A1 | 1/2014 |
| WO | 2018/066362 A1 | 4/2018 |
| WO | 2020/071975 A1 | 4/2020 |

OTHER PUBLICATIONS

Ericsson, "Late Provisioning of a Selected MNO", 3GPP TSG SA WG1 Meeting #66, S1-141124, May 12-16, 2014, 2 pages.

Ericsson, "Solution: Network Access for Credentials Provisioning Using External AUSF/ARPF", 3GPP TSG SA WG3 (Security) Meeting #86-Bis, S3-170752, Mar. 27-31, 2017, 3 pages.

ETSI, "Smart cards; Vocabulary for Smart Card Platform specifications", ETSI TR 102 216 V3.0 0, Technical Report, Sep. 2003, 19 pages.

Examination Report, IN App. No. 202147019826, dated Mar. 7, 2022, 7 pages.

Federal Aviation Administration, "Unmanned Aircraft Systems", pp. 39-45.

GSM Association, "Remote Provisioning Architecture for Embedded UICC Technical Specification", Version 3.1, May 27, 2016, 297 pages.

GSM Association, "Embedded SIM Remote Provisioning Architecture Version 1.1", GSMA, Dec. 17, 2013, 84 pages.

International Preliminary Report on Patentability, PCT App. No. PCT/SE2018/051025, dated Apr. 15, 2021, 16 pages.

International Preliminary Report on Patentability, PCT App. No. PCT/SE2018/051026, dated Apr. 15, 2021, 9 pages.

International Search Report and Written Opinion, PCT App. No. PCT/SE2018/051025, dated Mar. 20, 2019, 22 pages.

International Search Report and Written Opinion, PCT App. No. PCT/SE2018/051026, dated Jan. 24, 2019, 11 pages.

Invitation to Pay Additional Fees, PCT App. No. PCT/SE2018/051025, Jan. 28, 2019, 15 pages.

Kumar et al., "Updated version of ITU-T draft Supplement Y.IoT-Use-Cases "IoT Use Cases", output of SG-20 Q2/20 meeting, Cairo, May 6-16, 2018", SG20-TD844-R1, International Telecommunication Union, Telecommunication Standardization Sector, Study Period 2017-2020, Study Group 20, May 6-16, 2018, 83 pages.

Olkkonen, "Generic Authentication Architecture", TKK T-110.5290 Seminar on Network Security, 2006, 5 pages.

Samsung Electronics, "Smarter—Subscription Aspects", 3GPP TSG-SA WG1 Meeting #7 6-bis, S1-170207, Jan. 16-20, 2017, 2 pages.

Non-Final Office Action, U.S. Appl. No. 17/281,976, dated Feb. 26, 2023, 10 pages.

* cited by examiner

AUTHORIZATION OF A DEVICE BEING EQUIPPED WITH AN EMBEDDED UNIVERSAL INTEGRATED CIRCUIT CARD

CROSS-REFERENCE TO RELATED APPLICATIONS

This application is a National stage of International Application No. PCT/SE2018/051025, filed Oct. 5, 2018, which is hereby incorporated by reference.

TECHNICAL FIELD

The invention relates to a method and device for registering an embedded Universal Integrated Circuit Card (eUICC) for a device, and a method and device for controlling authorization of operation of a device being equipped with a eUICC.

BACKGROUND

Autonomous vehicles such as autonomous cars and unmanned aerial vehicles (UAVs), also named drones, are cars/aircrafts without a human driver/pilot aboard. Due to the potential danger that such vehicles represent, many countries aim at enforcing registration of every vehicle by the owner. This process links the autonomous vehicles with at least one person that can be held responsible in case of accident.

In the future, it is expected that many self-driving cars and drones will need to be connected to a mobile network (first 4G and then 5G) to carry out their task. This connectivity will be utilized for transporting control signalling required for controlling the vehicle as well as for transferring payload application data.

Historically, every cellular device, such as a mobile phone, smartphone, or any other mobile terminal which is configured for communicating over a cellular radio access network, such as Global System for Mobile Communications (GSM), Universal Mobile Telecommunications System (UMTS), or Long-Term Evolution (LTE), has been equipped with a removable Universal Integrated Circuit Card (UICC). The UICC is a smart card defined in ETSI TR 102 216. It typically contains a number of applications, in particular the Subscriber Identity Module (SIM) application for use in GSM networks and the Universal SIM (USIM) for use in UMTS and LTE networks. The SIM and USIM store the International Mobile Subscriber Identity (IMSI) and one or more keys, or shared secrets, for deriving keys used to identify and authenticate subscribers on mobile networks and for services provided by these networks.

Recently, the GSM Association (GSMA) has published specifications for a non-removable UICC, referred to as the embedded UICC or plainly eUICC. The eUICC contains an eSIM application, and the terms non-removable SIM, embedded SIM, and eSIM, are often used synonymously. The eUICC and its embedded SIM have the same functionality as the traditional UICC with its SIM and USIM, but the eUICC has a different form factor and is typically designed to be permanently soldered into a mobile terminal, rather than being removable. The eUICC is a smart card, similar to the UICC, i.e., an electronic device comprising embedded electronic circuits, such as a processor and memory.

By using eUICCs, the mobile terminal may be provisioned for the first time with its first commercial operator ("bootstrapping"), i.e., a Mobile Network Operator (MNO). Over The Air (OTA); that is without physically accessing the mobile terminal, in contrast to today's manually procedure which involves physically swapping the UICC. Other use-cases are, e.g., a "change of operator profile", i.e., when operator credentials on an eUICC are changed from a current commercial operator to a new commercial operator. As a further example, use-cases may also include "subscription transfer", i.e., when the operator credentials residing on a current eUICC are transferred to a new eUICC.

To provide mobile connectivity for autonomous vehicles, the manufacturers of the vehicles are expected to use eUICC. This technology defines a chain of trust between several entities that is used to provision the UE with profiles allowing it to connect the mobile networks.

However, the standard eUICC provisioning architecture does not consider the specificities of the autonomous vehicle ecosystem. When provisioning an eUICC with a profile, only the requirements of the telecom ecosystem are considered, while regulations pertaining to the autonomous vehicle ecosystem are disregarded.

SUMMARY

An object of the present invention is to solve, or at least mitigate, this problem and thus to provide an improved method of authorizing provisioning of an eUICC of a device with a profile.

This object is attained in a first aspect of the invention by a method of a service node of registering an eUICC for a device. The method comprises receiving information specifying ownership of the device and an identifier of the device, receiving an identifier of the eUICC and an identifier of the device, and storing the received information, wherein ownership of the device and the identifier of the eUICC being arranged in the device is registered with the service node.

This object is attained in a second aspect of the invention by a service node configured to register an eUICC for a device, the node comprising a processing unit and a memory, said memory containing instructions executable by said processing unit, whereby the service node is operative to receive information specifying ownership of the device and an identifier of the device, receive an identifier of the eUICC and an identifier of the device, and store the received information, wherein ownership of the device and the identifier of the eUICC being arranged in the device is registered with the service node.

This object is attained in a third aspect of the invention by a method of a service node of controlling authorization of operation of a device being equipped with an eUICC. The method comprises receiving an authorization request comprising an identifier of the eUICC to be provisioned with a profile in case of successful authorization, verifying, using the received eUICC identifier, that the eUICC previously has been registered to be arranged in a device and that information specifying ownership of the device in which the eUICC is indicated to be arranged previously has been registered and if the verification is successful, sending an authorization response indicating that authorization is approved, thereby allowing provisioning of the eUICC arranged in the device with a profile.

This object is attained in a fourth aspect of the invention by a service node configured to control authorization of operation of a device being equipped with an eUICC, the node comprising a processing unit and a memory, said memory containing instructions executable by said processing unit, whereby the service node is operative to receive an authorization request comprising an identifier of the eUICC (11) to be provisioned with a profile in case of successful authorization, verify, using the received eUICC identifier, that the eUICC previously has been registered to be arranged in a device and that information specifying ownership of the device in which the eUICC (11) is indicated to be arranged previously has been registered and if the verification is successful, send an authorization response indicating that authorization is approved, thereby allowing provisioning of the eUICC arranged in the device with a profile.

Hence, a device owner (or some other appropriate party) registers device ownership with a service node. Further, a device manufacturer (or some other appropriate party) registers the device with the service node along with a eUICC identifier.

After this procedure, the device owner and the device are both properly registered with the service node, wherein the eUICC may be provisioned with a profile such that operation of the device is enabled.

Thus, the owner of the device sends a provisioning request to an MNO comprising eUICC identifier as well as an appropriate identifier of the subscriber associated with the profile with which the eUICC is to be provisioned.

In response to the received subscription provisioning request, the MNO sends a request to the service node to authorize operation of the device comprising the identifier of the eUICC to be provisioned with a profile. Upon receiving the authorization request, the service node verifies that the device previously has been registered by checking that it has stored a device identifier associated with the received eUICC identifier, and that ownership has been properly registered, i.e. that a valid ownership identifier has been registered for the device.

If not, the process will terminate, and the service node informs the MNO that authorization is denied. However, if the verification is successful, the service node sends a positive authorization response to the MNO, wherein the MNO provisions the eUICC identified by the eUICC identifier with the profile associated with the subscribed identifier previously received from the device owner.

In an embodiment, the receiving of an authorization request further comprises receiving an identifier of the device and the verifying further comprises verifying that the received identifier of the device previously has been registered for the received eUICC identifier.

In an embodiment, the receiving of an authorization request further comprises receiving subscription information indicating whether a subscription assigned to the eUICC is applicable to the device or not, and if not sending an authorization response indicating that authorization is denied.

In an embodiment, the receiving of an authorization request further comprises receiving subscription information indicating which one or more category out of a plurality of categories the device is considered to belong based on at least one characteristic of the device, and wherein the verifying further comprises verifying that said one or more category complies with previously registered category information of the device.

In an embodiment, the receiving of an authorization request further comprises receiving an identifier of a subscriber to a subscription assigned to the eUICC of the device, the method further comprises storing the received subscriber identifier and the identifier of the device.

Further embodiments will be described in the following.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
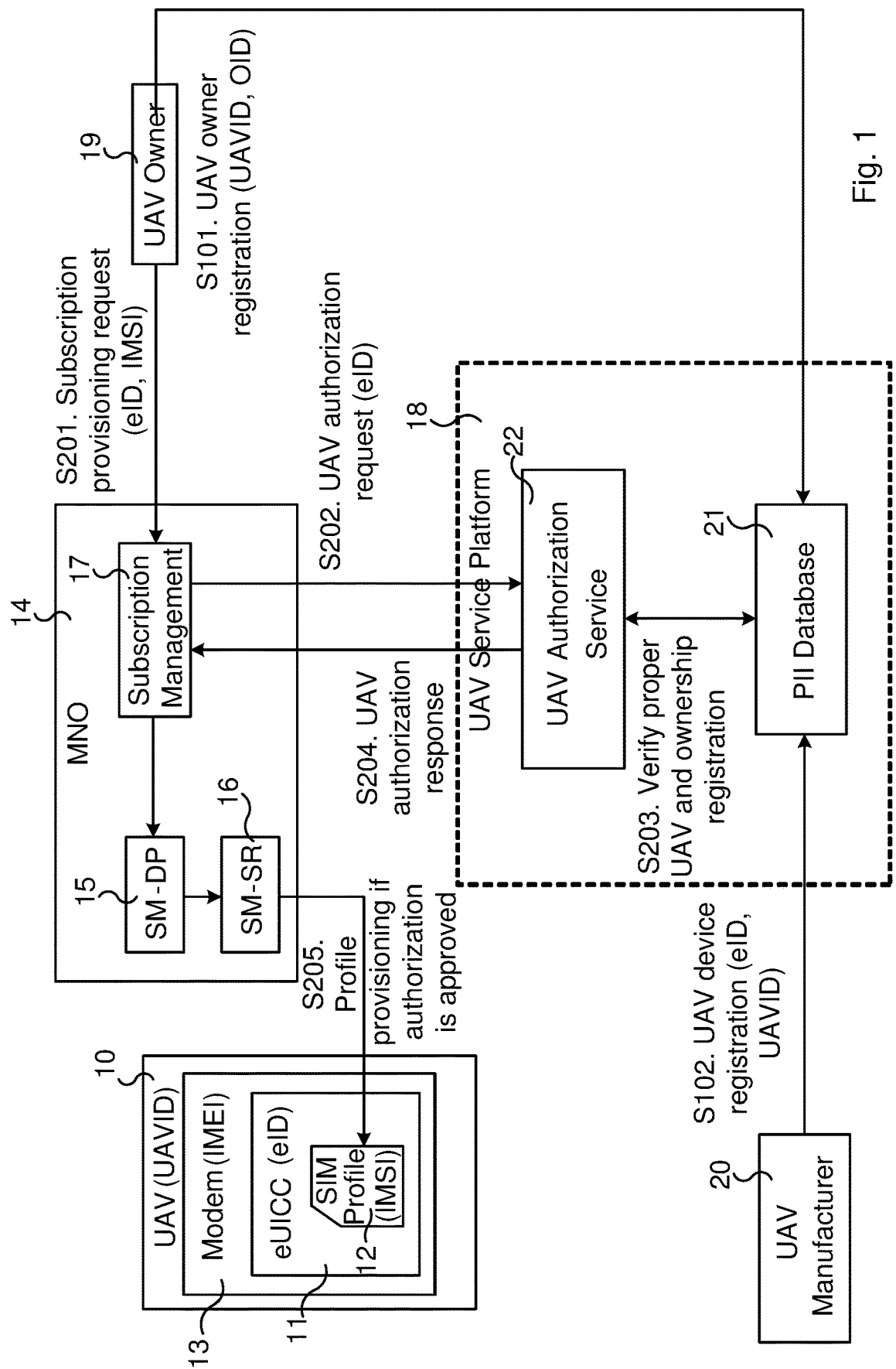
FIG. 1 illustrates a system where a eUICC of a device initially is registered before being authorized and subsequently provisioned with a SIM profile according to an embodiment.

FIG. 1 illustrates a system where a eUICC 11 of a device 10 initially is registered before being authorized and subsequently provisioned with a SIM profile 12 according to an embodiment.

FIG. 1 illustrates a process of supplying a device 10 such as an autonomous vehicle with an eUICC 11 and provisioning the eUICC 11 with a SIM profile 12 such that the device 10 can be operated according to an embodiment. The eUICC 11 is embedded in a 3GGP modem 13 enabling wireless communication with the device 11. In the following, the device 11 will be exemplified in the form of a UAV. However, the process may alternatively be performed for wireless communication devices such as smart phone, tablets, laptops, autonomous cars, etc.

The UAV 10 is identified by an identifier referred to as UAVID, the eUICC 11 is identified by an identifier referred to as eID, the SIM profile 12 is identified by an International Mobile Subscriber Identity (IMSI), and the modem 13 is identified by an International Mobile Equipment Identity (IMEI).

The provisioning of the SIM profile 12 to the eUICC 11 of the UAV 10 is performed by an MNO 14.

The MNO 14 typically hosts a Subscription Manager Data Preparation (SM-DP) entity 15 responsible for securely encrypting operator credentials ready for OTA installation. If the MNO 14 needs to create a new SIM profile 12, it orders one from the SM-DP entity 15. It is noted that the profile 12 need not contain any indication that it is to be used by a UAV, even though the MNO 14 may include such an indication.

The MNO 14 further hosts a Subscription Manager Secure Routing (SM-SR) entity 16 which enables secure download, enablement, disablement and deletion of profiles on the eUICC 11.

Moreover, the MNO 14 hosts a Subscription Management entity 17 responsible for UAV-specific subscriptions. As will be discussed in the following, the eUICC 11 of the UAV 10 will not be provisioned with the SIM profile 12 unless authorized by a service node referred to as a UAV Service Platform 18 (USP), and thus cannot be operated without the USP 18 performing the authentication. In other words, the UAV 10 will not be allowed to take off unless authorized to do so by the USP 18.

The Subscription Management entity 17 may handle UAV-specific subscriptions. This enables the MNO 14 to provide differentiated services for different UAV categories. In an embodiment, ranges of IMSIs are allocated for subscriptions dedicated for UAV usage. UAV subscriptions could also be identified using information contained in the SIM profile 12, for instance the Subscriber Profile ID. Specific SIM profiles may further be associated with different UAV categories (e.g. based on UAV weight, capabilities etc.) during the registration.

However, before provisioning of the eUICC 11 with the SIM profile 12 is possible—resulting in the UAV 10 being authorized to operate—a registration process must be performed. An embodiment of such a registration process will be discussed in the following, where an owner 19 of the UAV 10 and a manufacturer 20 of the UAV 10 registers required authorization data with the USP 18.

Figure 2:
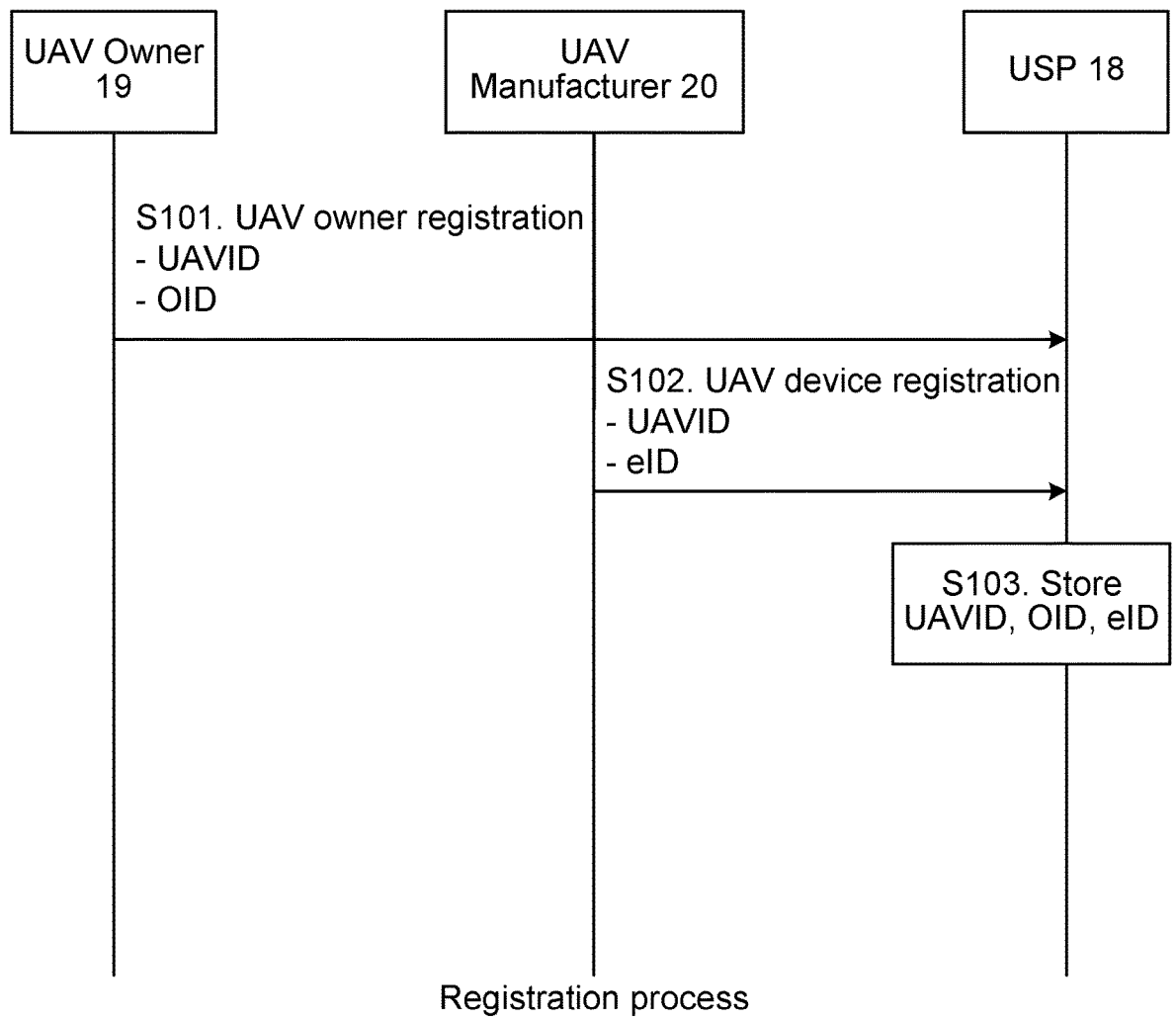
FIG. 2 shows a timing diagram illustrating a registration process according to an embodiment.

The registration process according to an embodiment will be described with reference to the system and process of FIG. 1 and further with reference to a signalling diagram shown in FIG. 2.

In step S101, the UAV owner 19 registers her UAV ownership with the USP 18, where a Personal Identifiable Information (PII) database 21 of the USP 18 will hold the information. It is noted that an appropriate party other than the UAV owner may register this information.

The UAV 10 is identified by the owner 19 by providing the UAVID to the USP 18. For instance, the UAVID may be noted in documentation associated with the UAV 10. The owner 16 may register her ownership by providing the USP 18 with an owner identifier OID. Hence, the UAVID and the OID is sent to the USP 18 in step S101.

It is envisaged that the UAV owner 19 may have to verify her identity and possibly also affirm that the UAV 13 has been legitimately acquired, for instance by presenting a receipt, to the USP 18 or to an authority being responsible for registering UAV ownership, in order to prove the ownership and thus attain a valid ownership identifier OID.

Further, in step S102, the UAV manufacturer 20 registers the particular UAV 10 with the USP 18 by sending the UAVID and the identifier eID of the eUICC 11 being embedded in the UAV 10. It is noted that an appropriate party other than the UAV manufacturer may register this information.

The USP 18 stores the registered UAVID, OID and the eID in the PII database 21 in step S103.

After this procedure, the UAV owner 19 and the UAV 10 are both properly registered with the USP 18, wherein the eUICC 10 may be provisioned with a SIM profile 12, thus enabling the UAV 10 to fly (within the framework set by regulations).

In the future, it might become illegal to provide internet connectivity to an autonomous vehicle, such as a UAV, that is not properly registered towards the authorities. However, the currently used eUICC provisioning ecosystem does not consider any UAV specificities and will "blindly", and possibly illegally, provision a profile to a eUICC in a UAV if the requirements in the telecom space are fulfilled. Advantageously, with this embodiment, the UAV is properly registered with the USP 18, which in practice could be and authority mandated to be responsible for such registrations.

Figure 3:
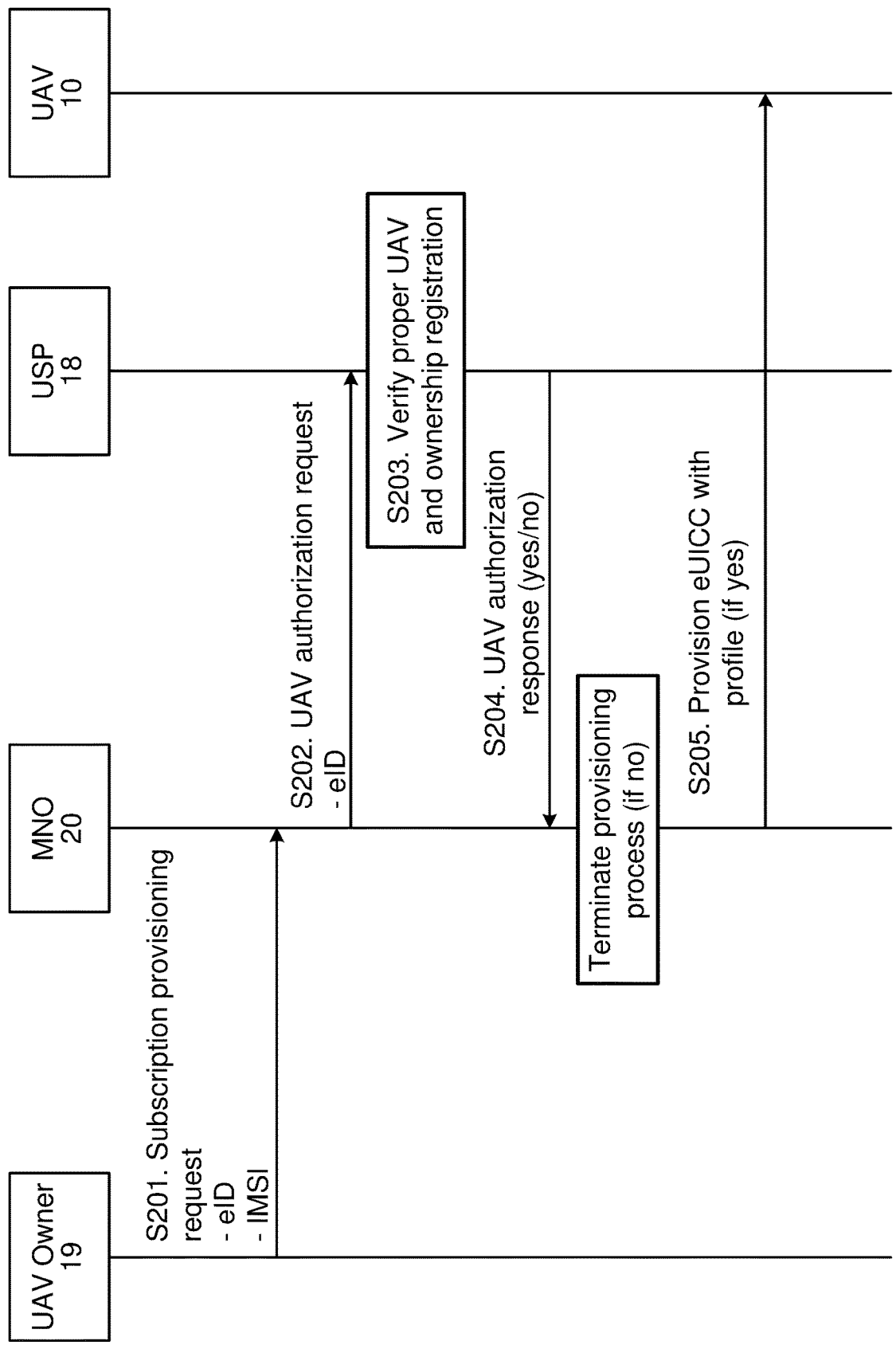
FIG. 3 shows a timing diagram illustrating an authorization process according to an embodiment.

In the following, an authorization and profile provisioning process according to an embodiment will be described with reference to the system and process of FIG. 1 and further with reference to a signalling diagram shown in FIG. 3.

In step S201, the owner 19 of the UAV 11 sends a provisioning request to the MNO 14 comprising the eID of the eUICC 11 embedded in the UAV 10 as well as an appropriate identifier—e.g. the IMSI—of the subscriber associated with the SIM profile 12 with which the eUICC 11 is to be provisioned. The owner 19 may be an individual or a company owning the UAV 10.

In response to the received subscription provisioning request, the Subscription Management entity 17 sends in step S202 a request to the USP 18 to authorize operation of the device 10, which in the case of a UAV constitutes a flight authorization request. The request comprises the eID of the eUICC 11 to be provisioned with a SIM profile. If the Subscription Management entity 17 is a capable of concluding e.g. from the IMSI that the eUICC to be provisioned is not arranged in a device for which ownership verification is to be made, the Subscription Management entity 17 could decide to perform the provisioning without further communication with the USP 18.

Upon receiving the UAV authorization request, an UAV Authorization Service 22 of the USP 18 verifies in step S203 that the UAV 10 previously has been registered by checking that there is a UAV identifier UAVIN associated with the received eID in the PII database 21 of the USP 18, and that ownership has been properly registered, i.e. that a valid ownership identifier OID has been registered for the UAVID.

If not, the process will terminate, and the USP 18 informs the MNO 14 that authorization is denied, wherein the Subscription Management entity 17 in its turn typically informs the UAV owner 19 that authorization is denied.

However, in this exemplifying embodiment, it is assumed that the UAVID and the OID indeed is found in the PII database 21 for the eID, and the USP 18 sends a positive UAV authorization response to the MNO 14 in step S204.

Finally, in response to receiving the authorization approval in step S204, the Subscription Management entity 17 provisions, via the SM-DP 15 and the SM-SR 16, the eUICC 11 identified by the eID with the SIM profile 12 associated with the IMSI previously received from the UAV owner 19 in step S201.

Advantageously, with the proposed embodiment, the UAV 10 can only be operated if the owner 19 properly has registered ownership of the UAV 10 with the USP 18, and if the UAV manufacturer 20 has registered the eUICC 11 to be provisioned with a profile for the device 10 associated with the ownership.

In an embodiment, to further enhance the security of the authorization process, the UAV owner 19 includes the UAVID in the provisioning request of step S201 to the Subscription Management entity 17, which in its turn includes the UAVID in the UAV authorization request of step S202.

The UAV Authorization Service 22 of the USP 18 will only issue a positive response in step S204 if it is verified in step S203 that also the received UAVID has been previously registered in the PII database 21.

As a consequence, the Subscription Management entity 17 will only provision the eUICC 11 with the SIM profile 12 if the UAV 10 indeed is the UAV corresponding to the UAVID for which the authorization was issued.

Figure 4:
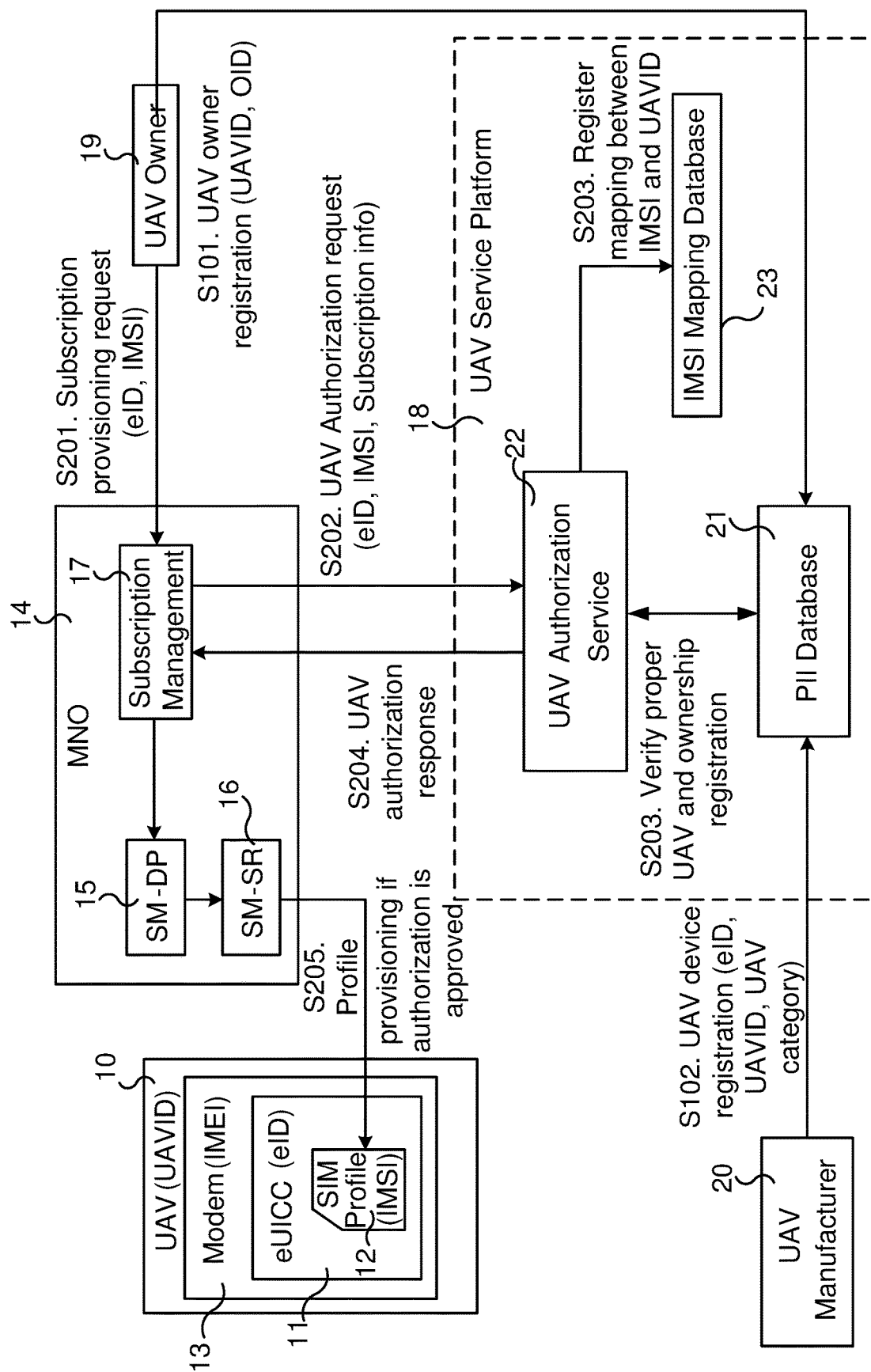
FIG. 4 illustrates a system where a eUICC of a device initially is registered before being authorized and subsequently provisioned with a SIM profile according to another embodiment.

FIG. 4 illustrates a further embodiment, where the Subscription Management entity 17 internally fetches subscription information associated with the received IMSI, and includes the subscription information and the IMSI in the UAV authorization request sent in step S202. This subscription information may for instance specify one or more categories that the UAV 10 complies with or not, e.g. if the UAV is of a Beyond Visual Line of Sight (BVLOS) type, a Visual Line of Sight (VLOS) type, UAV weight, capabilities), and even whether the subscription at all is applicable to a UAV.

In an embodiment where information specifying UAV category is included in the authorization request of step S202, the preceding registration process would include registering the UAV category with the USP 18. Typically, the UAV manufacturer would include the UAV category information in step S102 upon registering a particular UAV.

Now, in addition to performing the verification of step S203 which previously has been described with reference to FIG. 1, the UAV Authorization Service 22 would further for instance verify:

1) if the subscription is suitable for a UAV, and if so
2) if the UAV category indicated by the Subscription Management entity 17 complies with the UAV category previously registered by the UAV manufacturer 20.

If this verification is not successful, the response in step S204 indicates that the authorization is denied.

However, if the verification is successful, the UAV Authorization Service 22 registers in step S203a the IMSI associated with the SIM profile 12 provisioned to the eUICC 11 of UAV 10 identified by the UAVID, as well as the UAVID. Advantageously, the registered mapping between the IMSI and the UAVID can be used to generate an operational identity in the ecosystem for autonomous vehicles, for example mobile network assisted remote identification and tracking of autonomous vehicles.

Again, in case of successful verification in step S203, the USP 18 sends a positive UAV authorization response to the MNO 14 in step S204.

Finally, in response to receiving the authorization approval in step S204, the Subscription Management entity 17 provisions, via the SM-DP 15 and the SM-SR 16, the eUICC 11 identified by the eID with the SIM profile 12 associated with the IMSI previously received from the UAV owner 19 in step S201.

As can be concluded from above, with embodiments described herein, the standard eUICC ecosystem is augmented to integrate the autonomous device use-case specificities. A USP is configured to check for proper registration of an autonomous device before authorizing provisioning the eUICC(s) embedded in the device. Any autonomous device that is not properly registered would not be able to obtain mobile network connectivity, and thus could not be operated.

Advantageously, the proposed solution increases the safety of the provisioning of an autonomous device with mobile connectivity. It allows the enforcement of proper registration of the device before allowing anyone—even a rogue MNO—to provision its eUICC(s) with profiles.

This solution leverages the standard eUICC ecosystem. This allows the system to benefit from the chain of trust which is built, providing security along the lifecycle of the device.

Figure 5:
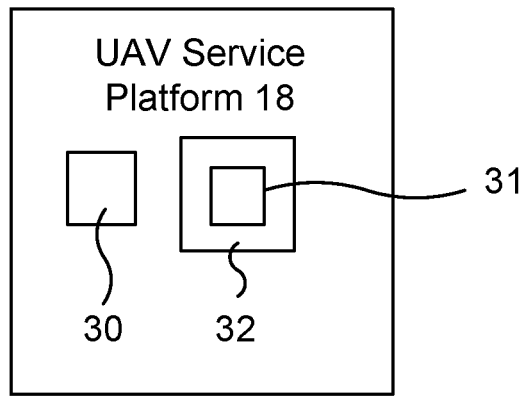
FIG. 5 illustrates a service node according to an embodiment.

FIG. 5 illustrates a USP 18 according to an embodiment. The steps of the method performed by the USP 18, being embodied e.g. in the form of a computer or a server or the like, of registering an eUICC for a device and controlling authorization of operation of the device being equipped with the eUICC according to embodiments are in practice performed by a processing unit 30 embodied in the form of one or more microprocessors arranged to execute a computer program 31 downloaded to a suitable storage volatile medium 32 associated with the microprocessor, such as a Random Access Memory (RAM), or a non-volatile storage medium such as a Flash memory or a hard disk drive. The processing unit 30 is arranged to cause the USP 18 to carry out the method according to embodiments when the appropriate computer program 31 comprising computer-executable instructions is downloaded to the storage medium 32 and executed by the processing unit 3o. The storage medium 32 may also be a computer program product comprising the computer program 31. Alternatively, the computer program 31 may be transferred to the storage medium 32 by means of a suitable computer program product, such as a Digital Versatile Disc (DVD) or a memory stick. As a further alternative, the computer program 31 may be downloaded to the storage medium 32 over a network. The processing unit 20 may alternatively be embodied in the form of a digital signal processor (DSP), an application specific integrated circuit (ASIC), a field-programmable gate array (FPGA), a complex programmable logic device (CPLD), etc.

Figure 6:
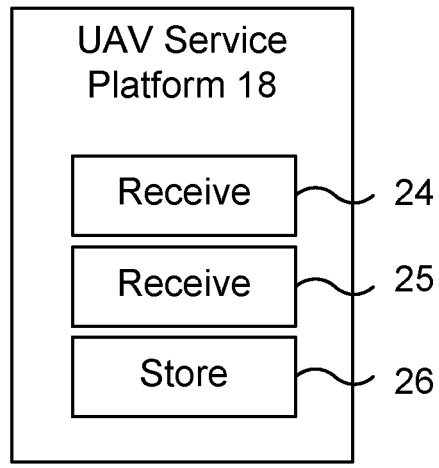
FIG. 6 illustrates a service node according to another embodiment.

FIG. 6 illustrates a USP 18 according to a further embodiment. The USP 18 comprises receiving means 24 adapted to receive information specifying ownership of the device and an identifier of the device, receiving means 25 adapted to receive an identifier of the eUICC and an identifier of the device, and storing means 26 adapted to store the received information, wherein ownership of the device and the identifier of the eUICC being arranged in the device is registered with the USPO 18.

The means 24-26 may comprise communication interface(s) for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

Figure 7:
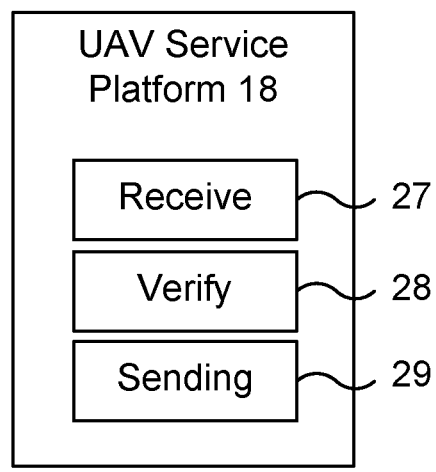
FIG. 7 illustrates a service node according to a further embodiment.

FIG. 7 illustrates an UP 18 according to another embodiment. The USP 1811 comprises receiving means 27 adapted to receive an authorization request comprising an identifier of the eUICC to be provisioned with a profile in case of successful authorization, verifying means 28 adapted to verify, using the received eUICC identifier, that the eUICC previously has been registered to be arranged in a device and that information specifying ownership of the device in which the eUICC is indicated to be arranged previously has been registered, and sending means 29 adapted to, if the verification is successful send an authorization response indicating that authorization is approved, thereby allowing provisioning of the eUICC arranged in the device with a profile (12).

The means 27-29 may comprise communication interface(s) for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of a service node of controlling authorization of operation of an unmanned aerial vehicle (UAV) being equipped with an embedded Universal Integrated Circuit Card (eUICC) comprising:
    receiving an authorization request comprising an identifier of the eUICC for the UAV to be provisioned with a profile in case of successful authorization and comprising subscription information indicating whether a subscription assigned to the eUICC is applicable to the UAV;
    verifying, using the identifier of the eUICC, that the eUICC previously has been registered to be arranged in the UAV and that information specifying ownership of the UAV in which the eUICC is indicated to be arranged previously has been registered, and verifying that the subscription assigned to the eUICC is applicable to the UAV; and
    in response to a verification being successful, sending an authorization response indicating that authorization is approved, thereby allowing provisioning of the eUICC arranged in the UAV with the profile.

2. The method of claim 1, wherein the receiving of the authorization request further comprises:
    receiving an identifier of the UAV; and
    verifying that the received identifier of the UAV previously has been registered for the received identifier of the eUICC.

3. The method of claim 1 further comprises:
    in response to the subscription information indicating that the subscription assigned to the eUICC is not applicable to the UAV, sending an authorization response indicating that authorization is denied.

4. The method of claim 1, wherein the
    subscription information further indicates which one or more category out of a plurality of categories the UAV is considered to belong based on at least one characteristic of the UAV.

5. The method of claim 1, wherein the receiving of the authorization request further comprises:
    receiving an identifier of a subscriber to the subscription assigned to the eUICC of the UAV; and
    storing the identifier of the subscriber.

6. A service node configured to control authorization of operation of an unmanned aerial vehicle (UAV) being equipped with an embedded Universal Integrated Circuit Card (eUICC) comprising:
    a processing unit; and
    a memory, said memory containing instructions which, when executed by said processing unit, cause the service node to:
        receive an authorization request comprising an identifier of the eUICC for the UAV to be provisioned with a profile in case of successful authorization and comprising subscription information indicating whether a subscription assigned to the eUICC is applicable to the UAV;
        verify, using the identifier of the eUICC, that the eUICC previously has been registered to be arranged in the UAV and that information specifying ownership of the UAV in which the eUICC is indicated to be arranged previously has been registered, and verify that the subscription assigned to the eUICC is applicable to the UAV; and
    in response to a verification being successful, send an authorization response indicating that authorization is approved, thereby allowing provisioning of the eUICC arranged in the UAV with the profile.

7. The service node of claim 6, further to, when receiving the authorization request:
    receive an identifier of the UAV; and
    verify that the received identifier of the UAV previously has been registered for the received identifier of the eUICC.

8. The service node of claim 6 further to
    in response to the subscription information indicating that the subscription assigned to the eUICC is not applicable to the UAV, send an authorization response indicating that authorization is denied.

9. The service node of claim 6,
    wherein the subscription information further indicates which one or more category out of a plurality of categories the UAV is considered to belong based on at least one characteristic of the UAV.

10. The service node of claim 6, further to, when receiving the authorization request:
    receive an identifier of a subscriber to the subscription assigned to the eUICC of the UAV; and
    store the identifier of the subscriber.

* * * * *